Sept. 8, 1942.      W. N. TUTTLE      2,294,941
NULL TYPE METER AND METHOD
Filed Jan. 8, 1941
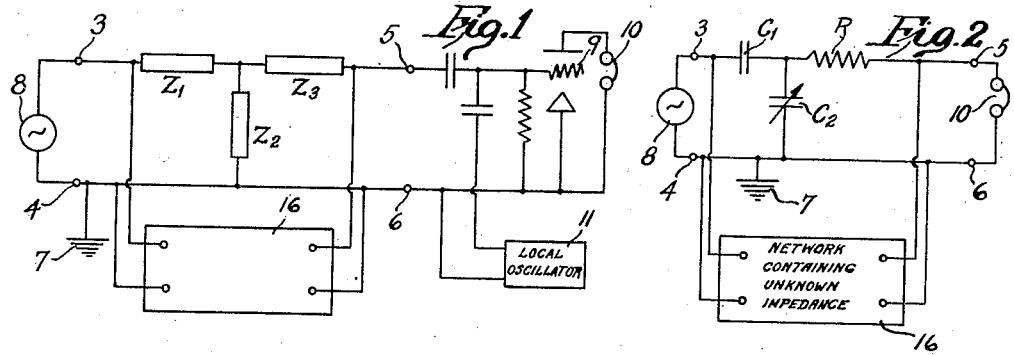
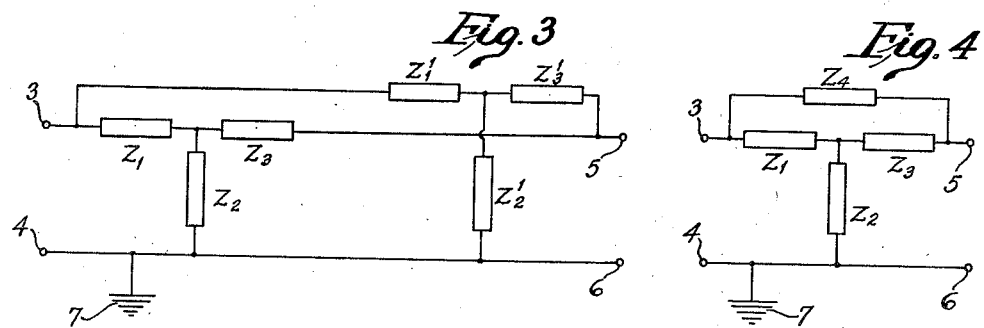
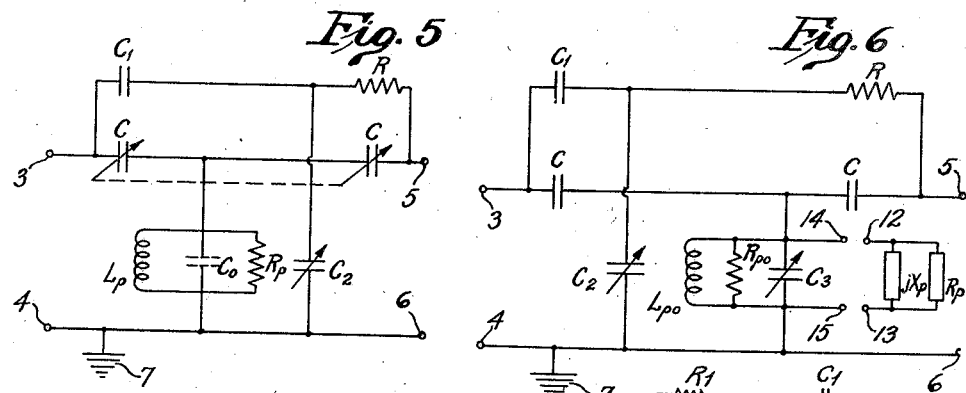
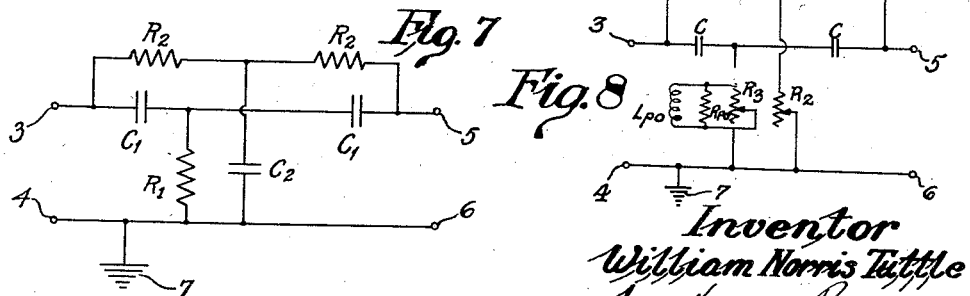
Inventor
William Norris Tuttle
by [signature]
Attorney Patented Sept. 8, 1942

2,294,941

UNITED STATES PATENT OFFICE 2,294,941

NULL TYPE METER AND METHOD

William Norris Tuttle, Concord, Mass., assignor to General Radio Company, Cambridge, Mass., a corporation of Massachusetts Application January 8, 1941, Serial No. 373,615

23 Claims. (Cl. 175—183)

The present invention relates to the art of electric measurements, and more particularly to alternating-current measurements. From a more specific aspect, the invention relates to apparatus and methods for the radio-frequency measurement of various quantities, including resistances and reactances, frequency and the power-factor of dielectrics. From a still more specific aspect, the invention relates to alternating-current measuring apparatus and methods employing bridged-T and the more general parallel-T networks wherein a null indication is obtained by adjustment of certain of the elements comprising the network. For such applications, bridged-T and parallel-T null circuits possess several advantages over conventional bridge circuits, particularly at radio frequencies.

An object of the invention, therefore, is to provide a new and improved meter of the above-described character embodying one or more T networks, and more particularly bridged-T and parallel-T networks.

A further object is to provide a new and improved null method of measuring impedances.

Another object is to provide a high-frequency meter of the above-described character that shall not contain, as necessary circuit elements, either inductance coils or variable resistors.

Still another object is to provide improved null-circuits for impedance measurements at high frequencies which do not require the use of coupling transformers.

Other and further objects will be explained hereinafter and will be particularly pointed out in the appended claims.

The invention will now be explained in connection with the accompanying drawing, in which Fig. 1 is a diagrammatic simplified view of circuits and apparatus arranged and constructed according to the present invention; Fig. 2 is a similar view of a modification; Fig. 3 is a similar view of parallel-T networks that may be employed according to the present invention; Fig. 4 is a similar view of a bridged-T network; Fig. 5 is a diagrammatic view illustrating a preferred embodiment of the invention; Fig. 6 is a similar view of a modification; and Figs. 7 and 8 are views illustrating still other forms of parallel-T networks.

The parallel-T network, as the terminology suggests, comprises two T network sections connected in parallel, as diagrammatically illustrated in Fig. 3. One of the T networks is shown as having two series impedance arms $Z_1$ and $Z_3$ and a shunt impedance arm $Z_2$. The other is shown as comprising two series impedance arms $Z'_1$ and $Z'_3$ and a shunt impedance arm $Z'_2$. The two T network sections are connected in parallel between common input terminals 3 and 4 and common output terminals 5 and 6. Though four input and output terminals 3, 4, 5 and 6 are thus illustrated, it will be observed that the network is, in effect, but a three-terminal network, the two terminals 4 and 6 being connected together to constitute a terminal common to the input and output circuits. It is thus possible to provide this terminal 4, 6 with a common ground 7.

A special case of this parallel-T network is the bridged-T network illustrated in Fig. 4. This comprises one of the T network sections, as in Fig. 3, having the series arms $Z_1$ and $Z_3$ and the shunt arm $Z_2$. The other T network section, however, is here shown degenerated into the form of a single impedance arm $Z_4$ connected directly in shunt with the two series arms $Z_1$ and $Z_3$.

The impedances $Z_1$, $Z_2$, $Z_3$, $Z'_1$, $Z'_2$, $Z'_3$ and $Z_4$ may be constituted of any combination of resistors, inductors and capacitors. As will hereinafter appear, however, particular impedances including resistors and capacitors, but no inductors, and having particular values, will yield especially desirable results in accordance with the present invention.

As an illustration of the nature of the impedances, the series impedances $Z_1$ and $Z_3$ are shown in Figs. 2, 5 and 6 as constituted of a fixed capacitor or condenser $C_1$ and a fixed resistor $R$, respectively, and the shunt impedance $Z_2$ as constituted of a variable capacitor or condenser $C_2$. Asymmetrical T network sections of this character may have special uses, as hereinafter more fully explained. In Fig. 7, on the other hand, they are represented as fixed resistors $R_2$ and $R_2$, of equal magnitude, and a fixed capacitor $C_2$. In this Fig. 7, the series impedances $Z'_1$ and $Z'_3$ of one of the T's are represented as constituted of two fixed equal capacitors $C_1$ and the shunt impedance $Z'_2$ as constituted of a fixed resistor $R_1$. The reactance of the series condensers $C_1$ of one of the T's of Fig. 7 may be made equal to the resistance of the series arms $R_2$ of the second T. The shunt impedances $R_1$ and $C_2$ may also be made equal, and of value equal to half the series impedances.

The series impedances $Z'_1$ and $Z'_3$ are represented in Fig. 5 as simultaneously variable equal-magnitude twin capacitors C, and in Fig. 6 as fixed capacitors C. The shunt impedance $Z'_2$ is shown in Figs. 5 and 6 as of more complicated structure, more fully explained hereinafter.

The input terminals 3 and 4 may be connected to any generator or other source 8 of alternating current. The output terminals 5 and 6 may be directly connected, without the aid of an interposed coupling transformer, to the input circuit of a detector 9. If the output circuit is provided with ear-phones or a loud-speaker 10, a local oscillator 11 may be provided. The source 8 of alternating current and the detector 9 are provided with the common ground 7. There is no need to employ the customary shielding transformer or Wagner ground.

When the circuit is balanced to give zero transmission, each of the component T network sections plays its part independently of the other. The null condition is simply that corresponding to equal and opposite transmission through the two component T network sections. Neither the impedance of the generator 8 ahead of the input terminals 3, 4 nor that of the common output circuit of the network, including the detector 9, can affect the balance conditions. At the input terminals 3, 4, the impedance of the source 8 affects equally the voltage applied to both T network sections, and no voltage can be developed across the output impedance because no current flows through it at balance. The requirements for null transmission at a single frequency, though entirely insufficient for filter and other purposes, are all that need be considered when the T or bridge network is used for measuring purposes. The mathematical conditions for obtaining balance may be found in my paper, entitled, "Bridged-T and parallel-T null circuits for measurements at radio frequencies," Proceedings of the Institute of Radio Engineers, January, 1940, commencing at page 23. It is there demonstrated that, in order to obtain balance, or a null condition, for a circuit comprising any number of parallel component T-networks, it is requisite that the sum of the transfer admittances, or the reciprocals of the transfer impedances, shall be substantially zero. If the circuit has only two component T-networks, the sum of the transfer impedances must also be zero:

$$Z_1 + Z_3 + \frac{Z_1 Z_3}{Z_2} + Z_1' + Z_3' + \frac{Z_1' Z_3'}{Z_2'} = 0$$

If the network has two parallel components, therefore, the transfer impedance of one must be substantially equal to that of the other, but of opposite sign.

In the case of the bridged T, this relation becomes $$Z_1 + Z_3 + \frac{Z_1 Z_3}{Z_2} + Z_4 = 0$$

It is because the transfer impedances can have properties, such as negative resistance, not realizable in simple impedances, that balance conditions are possible.

At radio frequencies, difficulty is encountered obtaining a satisfactory variable resistor. According to the embodiments of the invention illustrated in Figs. 2, 5 and 6, therefore, measurements may be made in terms of a fixed resistor R and a variable capacitor $C_2$. One of the T network sections has one series arm and the shunt arm of substantially pure capacitance and its other series arm contains a substantially pure fixed resistance. Reliance is placed upon the adjustment of the variable shunt condenser $C_2$, which does away with the necessity of employing variable resistors. If this shunt condenser $C_2$ alone be varied, as explained in my said paper, the capacitive component of the transfer impedance remains substantially unchanged and the resistive component alone is altered. The present invention lends itself to measurement at very high frequencies. Frequencies as high as 100 megacycles have already been employed.

An analogous arrangement for low-frequency work, shown in Fig. 8, employs a variable resistor $R_2$ in the shunt arm in place of the variable condenser $C_2$ of Figs. 5 and 6. As before, one of the series arms is resistive, as shown at $R_1$, and the other capacitive as shown at $C_1$. This arrangement permits the effect of a variable capacitance to be obtained by varying the resistance $R_2$. This is sometimes useful, because at low frequencies, in contrast to the high-frequency case, variable resistances can more easily be obtained than variable condensers. In this arrangement, the resistive component of the transfer impedance remains unchanged, as the shunt resistance $R_2$ is varied, while the capacitive component can be controlled as desired. Both in this arrangement and in that of Figs. 2, 5 and 6, the shunt arm and one of the series arms are like impedances, i. e., impedances of equal phase angle, and the impedance of the other series arm has a phase angle in quadrature to that of the first two arms. In both cases, the ratio of the values of the two like arms controls the effect of the third arm in the transfer impedance.

The parallel-T arrangement shown in Fig. 5 may be employed to make direct measurements of the reactance $L_p$ and resistance $R_p$ of an unknown high-frequency coil in terms of the other components of the circuit. Measurements of high-frequency resistors alone and condensers alone may also be made. In each case, the impedance to be measured is combined with other circuit elements to constitute a network. The network shown in Fig. 5 comprises the series-arm condenser elements C, C and the shunt arm of the T, this shunt arm being constituted of the unknown reactance $L_p$, the unknown resistance $R_p$, and distributed capacity $C_o$, all connected in parallel. Balance is obtained by varying the series condensers C, C and the shunt condenser $C_2$. Since the two series condensers can be controlled by a common shaft, as indicated by the dotted line of Fig. 5, only two controls are required. The value of the unknown inductance is determined from the relation $$L_p = \frac{1}{\left(2C + \frac{C^2}{C_1} + C_0\right)\omega^2}$$

The parallel resistive component $R_p$ is given by $$R_p = \frac{1}{R\left(1 + \frac{C_2}{C_1}\right)C^2\omega^2}$$

In the expression for the inductance, $L_p$, the value of the condenser $C_2$, which is adjusted to balance the resistance $R_p$, does not appear, and the expression in parenthesis in the denominator gives the total capacitance required to tune the coil to resonance at the test frequency. The control varying the condensers C, C can in consequence be calibrated directly in the total effective tuning capacitance, or in inductance at any selected frequency.

The resistance $R_p$, however, is less convenient to obtain, as the reading of the control determining the setting of the condenser $C_2$ must be multiplied by a factor depending on the setting of the condensers C, C, in addition to the factor depending on frequency.

This circuit is particularly adapted for substitution measurements, the arrangement of Fig. 6 being satisfactory for this application. An auxiliary coil must be employed, as indicated in Fig. 6 by the parallel inductive and resistive components $L_{po}$ and $R_{po}$. The series condensers C are made fixed instead of variable and an additional variable condenser $C_3$ is placed in parallel with the auxiliary coil. The unknown impedance, indicated by the parallel reactive and resistive components $jX_p$ and $R_p$ is shown disconnected. A preliminary balance is first made on the auxiliary coil $L_{po}$, $R_{po}$ by adjustment of the variable condensers $C_2$ and $C_3$. The unknown impedance is then connected at terminals 14 and 15 across the condenser $C_3$ and balance restored by readjustment of the condensers $C_2$ and $C_3$. The components of the unknown impedance are then given by the expressions $$X_p = \frac{1}{\omega \Delta C_3}$$

where $\Delta C_2$ and $\Delta C_3$ are the differences in the capacitance settings of the two corresponding condensers between the final and preliminary balances.

Since the condensers C, C are now fixed in value, the reading of the resistance-determining condenser $C_2$ does not, in the case of substitution measurements, require the correction depending on the value of the reactance-determining condensers C, C' which, as above stated, is necessary when the circuit is used for direct measurements. Although a frequency factor appears in the expressions both for reactance and for resistance, the two controls can be made direct reading in the two quantities $L_p$ and $R_p$, at any given frequency.

As before stated, one of the T network sections of Fig. 3 is shown in each of Figs. 2, 5 and 7 in specific form. Another T-network section, containing the unknown impedance to be measured, as before related, is shown in Figs. 5 and 7. As indicated in Figs. 1 and 2, the said other T-network section of Fig. 3, containing the unknown impedance to be measured, may assume other forms also, as shown generically at 16, and not necessarily comprising either a T network, or even the simple bridging arm of the bridged-T network of Fig. 4. One of these other forms is illustrated in Fig. 7.

The before mentioned common ground 7 serves also as a common ground for one side of each of the balancing condensers $C_2$ and $C_3$ of Fig. 6. This common ground eliminates the necessity for employing the shielded transformer that is commonly used in bridge circuits. It also renders harmless the effect of certain residual circuit capacitances. The capacitances between the input terminal 3 and the output terminal 5 to ground, for example, introduce no errors because they are connected across the generator and the detector. The capacitances between the two points of junction between the arms of the two T's to ground are connected across the balancing condensers $C_2$ and $C_3$. They affect the final conditions of balance no more than they do the initial conditions of balance, so cancel out in the final result. Different values of resistors and capacitors may be employed, as explained in my said paper, to vary the frequency band, by substituting different sets of resistors and condensers.

Further modifications will appear to persons skilled in the art, and all such are considered to fall within the spirit and scope of the invention, as defined in the appended claims.

What is claimed is:

1. A method of measuring an impedance comprising connecting the impedance to provide a transmission path between the input and output circuits of a T network and balancing the current in the output circuit from the T network against the current from the transmission path.

2. A method of measuring an impedance comprising connecting the impedance to a circuit element or elements to produce a network, connecting the network in parallel with a T network and adjusting the transfer impedance of one of the networks until it is substantially equal and of opposite sign to the transfer impedance of the other network.

3. A method of measuring an impedance comprising connecting the impedance to a circuit element or elements to produce a network, connecting the network in parallel with a T network and adjusting the networks until their transfer impedances are substantially equal and of opposite sign.

4. A method of measuring an impedance comprising connecting the impedance to circuit elements to form a network, connecting the network in parallel with a T network in which the shunt arm and one of the series arms have substantially equal phase angles and the other series arm has a phase angle substantially in quadrature with that of the first two arms, and adjusting the first network and the shunt arm of the T network to render the transfer impedances of the networks substantially equal and of opposite sign.

5. A method of measuring an impedance comprising connecting the impedance to a circuit element or elements to produce a network, connecting the network in parallel with a T network having a series arm consisting of a substantially pure fixed capacitance, a series arm consisting of a substantially pure fixed resistance and a shunt arm consisting of a substantially pure variable capacitance, and adjusting the capacitance of the variable shunt arm to render the transfer impedances of the networks substantially equal and of opposite sign.

6. A method of measuring an impedance comprising connecting the impedance to a circuit element or elements to produce a network, connecting the network in parallel with a T network having a series arm consisting of a substantially pure fixed capacitance, a series arm consisting of a substantially pure fixed resistance and a shunt arm consisting of a substantially pure variable capacitance, and adjusting the first network and the capacitance of the variable shunt arm to render the transfer impedances of the networks substantially equal and of opposite sign.

7. A method of measuring an impedance comprising connecting the impedance to a circuit element or elements to produce a network, connecting the network in parallel with a T network having the shunt arm and one of the series arms substantially pure resistance and the other series arm substantially pure reactance, and adjusting the first network and the resistance of the shunt arm of the T network to render the transfer impedances of the networks substantially equal and of opposite sign.

8. A method of measuring an impedance comprising balancing two parallel-connected T networks, connecting the impedance in parallel with the shunt arm of one of the networks, and thereafter adjusting the said shunt arm and the other network to rebalance the networks.

9. A method of measuring an impedance comprising balancing two parallel-connected T networks, connecting the impedance in parallel with the shunt arm of one of the networks, and thereafter adjusting the said one network to balance it with the other network.

10. A null-type circuit for measuring an impedance comprising a T network having input and output circuits, means connecting the impedance in combination with the T network to provide a transmission path between the input and output circuits, and means for balancing the combination.

11. A null-type circuit for measuring an impedance having, in combination, a circuit element or elements, means for connecting the impedance to the circuit element or elements to produce a network, a T network, the networks having common input and output terminals, and means for adjusting one of the networks to render the transfer impedances of the networks substantially equal and of opposite sign.

12. A null-type circuit for measuring an impedance having, in combination, a circuit element or elements, means for connecting the impedance to the circuit element or elements to produce a network, a second network including a series arm and a shunt arm, the networks having common input and output terminals and a common point for one of the input terminals and one of the output terminals, and means for adjusting the networks to render the transfer impedances substantially equal and of opposite sign.

13. A null-type circuit for measuring an impedance having, in combination, a circuit element or elements, means for connecting the impedance to the circuit element or elements to produce a network, a second network including a series arm and a shunt arm, the networks having common input and output terminals, means for supplying alternating current to the input terminals, a detector having an input circuit and an output circuit, transformer-less means for connecting the detector input circuit to the output terminals, and means for adjusting one of the networks to render the transfer impedances substantially equal and of opposite sign.

14. A null-type circuit for measuring an impedance having, in combination, a circuit element or elements, means for connecting the impedance to the circuit element or elements to produce a network, a T network, the networks having common input and output terminals, means for supplying alternating current to the input terminals, detecting means connected to the output terminals, the alternating-current supplying means and the detecting means having a common point, and means for adjusting one of the networks to render the transfer impedances substantially equal and of opposite sign.

15. A null-type circuit for measuring an impedance having, in combination, a circuit element or elements, means for connecting the impedance to the circuit element or elements to produce a network, a T network having a series arm containing a substantially pure fixed capacitance, a series arm containing a substantially pure fixed resistance, and a shunt arm containing a substantially pure variable capacitance, the networks having common input and output terminals, and means for adjusting the capacitance of the variable shunt arm to render the transfer impedances of the networks substantially equal and of opposite sign.

16. A null-type circuit for measuring an impedance having, in combination, a circuit element or elements, means for connecting the impedance to the circuit element or elements to produce a network, a T network having a series arm containing a substantially pure fixed capacitance, a series arm containing a substantially pure fixed resistance, and a shunt arm containing a substantially pure variable capacitance, the networks having common input and output terminals, whereby variations in the shunt capacitance cause variations in the resistive component of the transfer impedance and leave substantially unchanged the capacitive component, and means for adjusting the capacitance of the variable shunt arm to render the transfer impedance of the networks substantially equal and of opposite sign.

17. A null-type circuit for measuring an impedance having, in combination, a circuit element or elements, means for connecting the impedance to the circuit element or elements to produce a T network having the impedance in the shunt arm thereof and having two series arms each having a variable capacitor, the capacitors being simultaneously variable to maintain their capacitances substantially equal, a T network having a series arm containing a substantially pure fixed capacitance, a series arm containing a substantially pure fixed resistance, and a shunt arm containing a substantially pure variable capacitor, the networks having common input and output terminals, and means for adjusting the capacitance of the variable capacitors to render the transfer impedances of the networks substantially equal and of opposite sign.

18. A null-type circuit for measuring an impedance having, in combination, a T network having fixed capacitive series arms and including the impedance in the shunt arm, a T network having a fixed capacitive series arm, a variable capacitive shunt arm, and a fixed resistive series arm, the networks having common input and output terminals, and means for adjusting the shunt arms to balance the networks.

19. A null-type circuit for measuring an impedance having, in combination, a T network having fixed capacitive series arms and a reactor in parallel with a variable capacitor in the shunt arm, a T network having a fixed resistive series arm, a fixed capacitive series arm, and a variable capacitor in the shunt arm, the networks having common input and output terminals, and means for adjusting the variable capacitors to balance the networks.

20. A null-type circuit for measuring an impedance having, in combination, two parallel-connected T networks, means for balancing the networks, means for connecting the impedance in parallel with the shunt arm of one of the networks, and means for adjusting the said shunt arm and the other network to rebalance the networks.

21. A null-type circuit for measuring an impedance having, in combination, a circuit element or elements, means for connecting the impedance to the circuit element or elements to produce a T network, a second T network, the networks having common input and output terminals, and means for adjusting one of the networks to render the transfer impedances of the networks substantially equal and of opposite sign.

22. A null-type circuit for measuring an impedance having, in combination, a circuit element or elements, means for connecting the impedance to the circuit element or elements to produce a T network, a second T network, the networks having common input and output terminals, and means for adjusting the networks to render the transfer impedances of the networks substantially equal and of opposite sign.

23. A null-type circuit for measuring an impedance having, in combination, a T network, means for connecting the impedance in parallel to the series arms of the T, and means for adjusting the T network to render the transfer impedance of the T network substantially equal to the impedance and of opposite sign thereto.

WILLIAM N. TUTTLE.

Certificate of Correction

Patent No. 2,294,941. September 8, 1942.

WILLIAM NORRIS TUTTLE

It is hereby certified that error appears in the printed specification of the above numbered patent requiring correction as follows: Page 3, first column, line 24-25, after the formula and before "where" insert the following:

$$R_p = \frac{1}{R\left(\frac{\Delta C_2}{C_1}\right)C^2\omega^2}$$

and that the said Letters Patent should be read with this correction therein that the same may conform to the record of the case in the Patent Office.

Signed and sealed this 6th day of October, A. D. 1942.

(SEAL)

HENRY VAN ARSDALE,
*Acting Commissioner of Patents.*